US009004601B2

(12) United States Patent
Higashi et al.

(10) Patent No.: US 9,004,601 B2
(45) Date of Patent: Apr. 14, 2015

(54) SEAT RECLINING APPARATUS

(71) Applicant: Shiroki Corporation, Kanagawa (JP)

(72) Inventors: Nobumasa Higashi, Kanagawa (JP);
Noriaki Maeda, Kanagawa (JP);
Kazutaka Sasaki, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 14/031,686

(22) Filed: Sep. 19, 2013

(65) Prior Publication Data
US 2014/0077563 A1    Mar. 20, 2014

(30) Foreign Application Priority Data

Sep. 19, 2012  (JP) ................. 2012-205992

(51) Int. Cl.
*B60N 2/235*   (2006.01)
*A47C 1/024*   (2006.01)

(52) U.S. Cl.
CPC .............. *A47C 1/024* (2013.01); *B60N 2/2356* (2013.01)

(58) Field of Classification Search
CPC ............................ B60N 2/235; B60N 2/2356
USPC ............................................ 297/367 P, 367 L
See application file for complete search history.

(56) References Cited

U.S. PATENT DOCUMENTS 7,988,233 B2 *   8/2011   Yamada et al. ............. 297/367 P
8,002,352 B2 *   8/2011   Yamada et al. ......... 297/367 L X
8,002,353 B2 *   8/2011   Yamada et al. ......... 297/367 L X
8,430,453 B2 *   4/2013   Fujishiro et al. ........... 297/367 P
8,602,498 B2 *  12/2013   Yamada et al. ............. 297/367 L
8,651,578 B2 *   2/2014   Yamada et al. ............. 297/367 P
2011/0115271 A1 *  5/2011   Yamada et al. ............. 297/367 P
2014/0077561 A1 *  3/2014   Sasaki ........................ 297/367 P

FOREIGN PATENT DOCUMENTS

JP    2003 009978    1/2003

OTHER PUBLICATIONS

Aisin Seiki Co Ltd., "Seat Reclining Device," Patent Abstracts of Japan, Publication Date: Jan. 14, 2003; English Abstract of JP-2003 009978.

* cited by examiner

*Primary Examiner* — Rodney B White
(74) *Attorney, Agent, or Firm* — Millen, White, Zelano & Branigan, P.C.

(57) ABSTRACT

A seat reclining apparatus includes a base plate, a ratchet plate, lock members supported by the base plate to be movable between engaged and disengaged positions, an operating mechanism for moving the lock members between the engaged and disengaged positions, and an unlocked-state forcibly holding mechanism, for forcibly holding each of the lock members, including a forced lock release projection on one lock member and a forced lock release surface on the ratchet plate and which engages with the forced lock release projection to hold the lock members in the disengaged position. The lock members, on which the forced lock release projection is not formed, are subjected to a force so as to be urged downward due to gravity when the seatback is in between the forwardly-tilted position and the first-stage locked position.

4 Claims, 13 Drawing Sheets

SEAT RECLINING APPARATUS

BACKGROUND OF THE INVENTION

1. Field of the Invention

The present invention relates to a seat reclining apparatus.

2. Description of Related Art

A seat reclining apparatus in which a base plate and a ratchet plate (ratchet) that are rotatable relative to each other about a relative rotation axis are fixed to one and the other of a seat cushion side frame and a seatback side frame, respectively, is known in the art as a seat reclining apparatus installed onto a vehicle seat. An internal gear which extends circumferentially about the relative rotation axis for the base plate and the ratchet plate is formed on the ratchet plate, and a plurality of lock members, each of which has an outer toothed portion engageable with the internal gear of the ratchet plate, are supported by the base plate to be movable between an engaged position in which the outer toothed portion is engaged with the internal gear and a disengaged position in which the outer toothed portion is disengaged from the internal gear. Operating an operating mechanism (cam mechanism) causes each of the plurality of lock members to move between the engaged position and the disengaged position, thus allowing the seatback to be fixed at an arbitrary position when the seatback is in a seating position, whereas each of the plurality of lock members is held in the disengaged position by an unlocked-state forcibly holding mechanism when the seatback is positioned between the fully-forward tilted position and the first-stage locked position. This structure is disclosed in Japanese Unexamined Patent Publication No. 2003-9978.

This unlocked-state forcibly holding mechanism has been structured such that at least one of the plurality of lock members is provided with a forced lock release projection and the ratchet plate is provided with a forced lock release surface which engages with the aforementioned forced lock release projection to hold the aforementioned at least one lock member in the disengaged position when the seatback is in between the fully-forward tilted position and the first-stage locked position (Japanese Unexamined Patent Publication No. 2003-9978).

However, if the lock member(s) provided with the forced lock release projection is positioned above the relative rotation axis while another lock member(s) provided with no forced lock release projection is positioned below the relative rotation axis, there is a possibility of a half-locked state occurring as a result of the lock member(s) having no forced lock release projection which is held in the disengaged position by the unlocked-state forcibly holding mechanism moving in the downward direction (a direction to be engaged with the internal gear of the ratchet plate) due to some reason (e.g., due to an operation of the aforementioned operating mechanism or differences in dimensions of the lock members and the guide grooves). The aforementioned half-locked state is a state in which the outer toothed portion of the lock member(s) that is movably held by the base plate is half-engaged with the internal gear of the ratchet plate, thus making it difficult to make an adjustment to the seatback or causing an incomplete locked state of the seatback.

SUMMARY OF THE INVENTION

The present invention has been devised in consideration of the above described problems, and provides a seat reclining apparatus capable of preventing the occurrence of the aforementioned half-locked state when the seat reclining apparatus is in an unlocked holding state (i.e., a state in which the seat reclining apparatus is held in an unlocked state).

Furthermore, the present invention has been devised based on the findings that the lock member(s) among the plurality of lock members that is positioned above a horizontal line passing through a relative rotation axis for the base plate and the ratchet plate is subjected to a force urging this lock member downward (in the disengaged direction) due to gravity, hence, the lock member(s) that is positioned above the horizontal line passing through the relative rotation axis is not required to be provided with any forced lock release projection.

According to an aspect of the present invention, a seat reclining apparatus is provided, a base plate which is fixed to one of a seat cushion side frame and a seatback side frame; a ratchet plate, which includes an internal gear, the ratchet plate being fixed to the other of the seat cushion side frame and the seatback side frame so as to face the base plate while being rotatable relative thereto about a relative rotation axis, wherein the internal gear is centered about the relative rotation axis; a plurality of lock members, each of which includes an outer toothed portion which is engageable with the internal gear and is supported by the base plate so as to be movable between an engaged position in which the outer toothed portion is engaged with the internal gear and a disengaged position in which the outer toothed portion is disengaged from the internal gear; an operating mechanism for moving each of the lock members between the engaged position and the disengaged position; and an unlocked-state forcibly holding mechanism for forcibly holding each of the lock members in the disengaged position. The unlocked-state forcibly holding mechanism includes a forced lock release projection which is formed on at least one of the lock members except another one of the lock members, and a forced lock release surface which is formed on the ratchet plate and engages with the forced lock release projection to hold the lock members in the disengaged position when the seatback is in between a forwardly-tilted position and a first-stage locked position. The lock members on which the forced lock release projection is not formed are positioned above a horizontal line passing through the relative rotation axis so as to be subjected to a force that urges the lock members, on which the forced lock release projection is not formed, downward due to gravity when the seatback is in between the forwardly-tilted position and the first-stage locked position.

It is desirable for the seat reclining apparatus to include a secondary unlocked-state forcibly holding mechanism for holding the lock members on which the forced lock release projection is not formed in the disengaged position, the secondary unlocked-state forcibly holding mechanism being positioned between the lock members on which the forced lock release projection is not formed and a cam mechanism for moving each of the lock members between the engaged position and the disengaged position.

The secondary unlocked-state forcibly holding mechanism can be made as a simple mechanism composed of a cam mechanism.

It is practical for three the lock members to be provided, arranged at equi-angular intervals in a circumferential direction, wherein the forced lock release projection is formed on only one of the three lock members, and the forced lock release projection is formed on neither of remaining two of the three lock members.

According to the present invention, a seat reclining apparatus is achieved, which can perform a secure locking operation in which a half-locked state does not occur when the seat reclining apparatus is in an unlocked holding state, and furthermore, since the number of lock members which are provided with a forced lock release projection can be reduced, a reduction in cost can be achieved.

The present disclosure relates to subject matter contained in Japanese Patent Application No. 2012-205992 (filed on Sep. 19, 2012) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
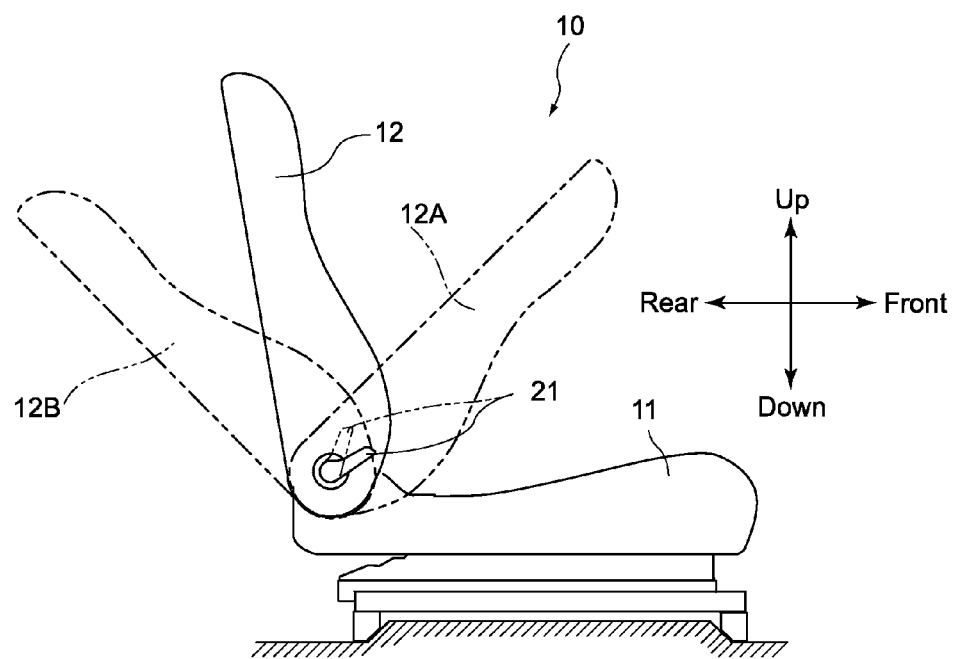
FIG. 1 is a side elevational view of a vehicle seat to which an embodiment of a seat reclining apparatus according to the present invention has been applied.

An embodiment of the present invention will be hereinafter discussed with reference to FIGS. 1 through 25. Directions described in the following description are defined based on the directions of arrows shown in the drawings. In the following description, the term "inner peripheral side" refers to the center side of a base plate 27 of the seat reclining apparatus 25 and the term "outer peripheral side" refers to the radially opposite side of the base plate 27 from the center side thereof.

A vehicle seat 10 shown in FIG. 1 is a right-side seat and is provided with a seat cushion 11 which is supported by a vehicle interior floor of a vehicle (e.g., an automobile) via a seat rail, and a seatback 12 which is rotatable relative to (pivoted at) the rear of the seat cushion 11. A pair of left and right seat cushion frames, made of metal, are installed inside the seat cushion 11 in a fixed state. Each seat cushion frame is a plate-shaped member extending in the forward/rearward direction (horizontal direction with respect to FIG. 1), and the rear end of each seat cushion frame includes a rear frame (seat cushion side frame) 13 (see FIG. 2, etc.), made of metal, which projects upward. The rear frame 13 is provided with a seat-cushion-side connecting hole 14 formed as a circular through-hole with three engaging holes 15 formed at intervals of 120 degrees (i.e. at equi-angular intervals) at the circumference thereof. The three engaging holes 15 are formed in such a manner to be recessed radially outwards from the circumference of the seat-cushion-side connecting hole 14. Each engaging hole 15 is substantially rectangular in shape, and both ends of each engaging hole 15 in the lengthwise direction thereof (circumferential direction about the center of the seat-cushion-side connecting hole 14) are formed by two flat portions 15a which are parallel to each other. The vehicle seat 10 is provided inside the seatback 12 with a pair of left and right seatback side frames 16 (only a lower part of the right seatback side frame 16 is shown by two-dot chain lines in FIG. 2) made of metal which are installed in a fixed state (see FIG. 2). Each seatback side frame 16 is a plate-shaped member extending in the lengthwise direction of the seatback 12. Each seatback side frame 16 is provided, in a lower portion thereof (which becomes a rear portion thereof when the seatback 12 is tilted forward), with a seatback-side connecting hole 17 formed as a through-hole which includes a substantially square-shaped hole and a total of four fitting holes 18 which are respectively formed on the four sides of the aforementioned square-shaped hole. Each fitting hole 18 is substantially rectangular in shape.

The left and right rear frames 13 are installed in the internal space of the seatback 12. The left and right seatback side frames 16 are positioned in between the left and right rear frames 13. The left seatback side frame 16 and the left rear frames 13 face each other in the leftward/rightward direction (vehicle widthwise direction) and the right seatback side frame 16 and the right rear frames 13 face each other in the leftward/rightward direction (vehicle widthwise direction). The left rear frame 13 and the left seatback side frame 16 are connected to each other to be rotatable via a rotational connecting shaft (not shown). On the other hand, the right rear frame 13 and the right seatback side frame 16 are connected to each other via a seat reclining apparatus 25 to be rotatable about an axis extending in the leftward/rightward direction.

The seatback 12 (the seatback side frames 16) is rotatable about the aforementioned rotational connecting shaft and the seat reclining apparatus 25 relative to the seat cushion 11 (the rear frames 13). Specifically, the seatback 12 (the seatback side frames 16) is rotatable between a forwardly-tilted position shown by a two-dot chain line designated by 12A in FIG. 1 and a rearward-tilted position shown by a solid line designated by 12B in FIG. 1.

The detailed structure of the seat reclining apparatus 25 will be discussed hereinafter.

The seat reclining apparatus 25 is provided with the base plate 27, two lock members (pawls) 36, a lock member (pawl) 37, a wedge (second cam) 41, a rotational cam 47, a rotational center shaft 51, a ratchet plate 57, a retaining ring 64, a lock spring 68 and a spring cover 72, which are major elements of the seat reclining apparatus 25.

The base plate 27 is a metal disk member which is formed by press molding. The base plate 27 is provided on the outer edge of the left side thereof with a projecting large-diameter annular flange 28. The base plate 27 is provided with an accommodation space radially inside of the large-diameter annular flange 28. The base plate 27 is provided at a center thereof with a bearing hole 29 formed as a through-hole which is circular in cross sectional shape. The base plate 27 is provided on the left side thereof with three groove-forming projections 30 (see FIGS. 21 through 24) which project and are arranged at intervals of 120 degrees about the bearing hole 29. Each groove-forming projection 30 is substantially in the shape of a sector. The three groove-forming projections 30 are formed by pressing the right side of the base plate 27 leftward using a mold when the base plate 27 is formed by press molding. As shown in the drawings, a circular-arc-shaped clearance is formed between the outer periphery of each groove-forming projection 30 and the large-diameter annular flange 28. Both side surfaces of each groove-forming projection 30 (with respect to the circumferential direction of the base plate 27) are formed as flat guide surfaces 30a, and the flat guide surfaces 30a (opposed surfaces) of any two adjacent groove-forming projections 30 (which face each other in the circumferential direction) are parallel to each other, and a guide groove 31 is formed therebetween. The base plate 27 is further provided, on the right side thereof on the opposite sides from the three guide grooves 31, with a total of three welding protrusions (see FIGS. 2, 4, 6, etc.), respectively, which project rightward. The three welding protrusions 33 are formed by pressing the bottoms (left side surfaces) of the three guide grooves 31 rightward by a mold when the base plate 27 is formed by press molding. The base plate 27 is further provided at the bases of the three guide grooves 31 with three protrusion-corresponding recesses 32 which are formed by the mold (which presses left side surfaces the bases of the three guide grooves 31) on the opposite sides from the three welding protrusions 33, respectively (see FIGS. 8, 9, 10, 12 and 13). Each welding protrusion 33 is substantially rectangular in shape, and both end surfaces of each welding protrusion 33 in the lengthwise direction thereof are formed as side end surfaces 33a which are flat surfaces parallel to each other. In addition, a retaining projection 34 is formed on a center portion of the inner periphery of each welding protrusion 33 to project slightly toward the center of the base plate 27 (toward the inner peripheral side). The base plate 27 is further provided, on the right side thereof in the vicinity of the front welding protrusion 33 (the right welding protrusion 33 with respect to FIG. 13), with a pair of lock projections 35 which project rightward (see FIGS. 2, 13 and 14).

Figure 21:
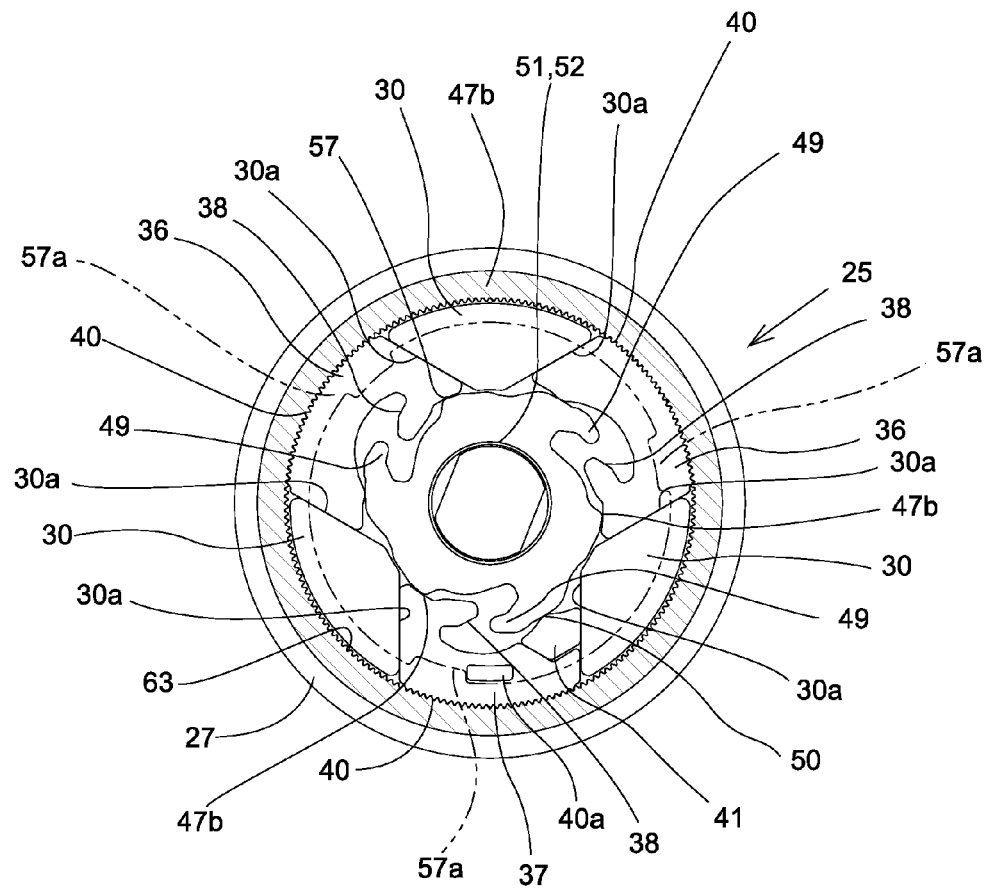
FIG. 21 is a cross sectional view taken along the line XXI-XXI shown in FIG. 8, viewed in the direction of the appended arrows, from which the seat cushion side frame, a retaining ring, anti-rotation pins and an annular flange are removed for clarity.

The two lock members 36 are installed in two of the three guide grooves 31, specifically in the front guide groove 31 (the left guide groove 31 with respect to FIG. 21) and the rear guide groove 31 (the right guide groove 31 with respect to FIG. 21), and the lock member 37 and the wedge 41 are installed in the upper guide groove 31 (the upper guide groove 31 with respect to FIG. 21).

Figure 24:
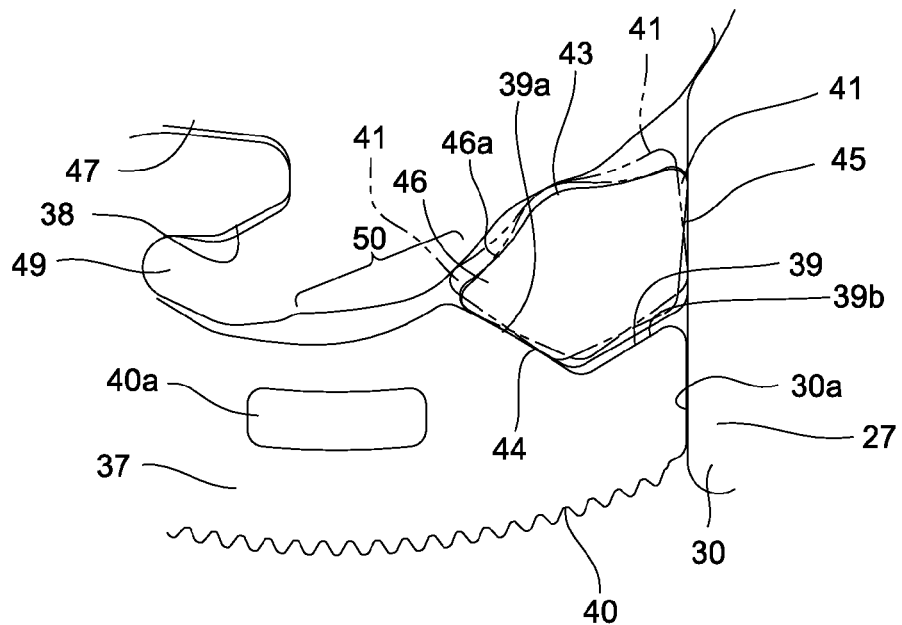
FIG. 24 is an enlarged view of a portion of the seat reclining apparatus which is designated by the Roman numeral XI shown in FIG. 22.

The two lock members 36 and the lock member 37 are press-molded products made of metal plates, and the thicknesses of the three lock members 36 and 37 are substantially the same as the depths of the three guide grooves 31. A cam groove 38 is formed in each of the three lock members 36 and 37, while a wedge-engaging groove 39 is formed only in the lock member 37. As shown in FIG. 24, the wedge-engaging groove 39 is provided with a circumferential parallel portion 39b, which extends substantially parallel to the circumferential direction about the axis of the base plate 27, and a pressed portion 39a, which extends obliquely toward the inner peripheral side from one end (the left end with respect to FIG. 24) of the circumferential parallel portion 39b. The pressed portion 39a is not linear (flat) in shape, specifically a curved surface which is convex toward the space formed by the wedge-engaging groove 39 (toward the wedge 41; toward the upper right side with respect to FIG. 24) (however, the curvature of the pressed portion 39a is extremely small, so that the pressed portion 39a appears to be substantially straight to the naked eye). The two lock members 36 and the lock member 37 are each provided on the circular-arc-shaped outer peripheral surface thereof with an outer toothed portion 40.

The wedge 41, which can be installed in the space formed by the wedge-engaging groove 39 of the wedge-engaging groove of the lock member 37, is a press-molded product made of a metal plate. The wedge 41 has smaller outside dimensions than the two lock members 36 and the lock member 37 and has substantially the same thickness as that of the two lock members 36 and the lock member 37.

Figure 25:
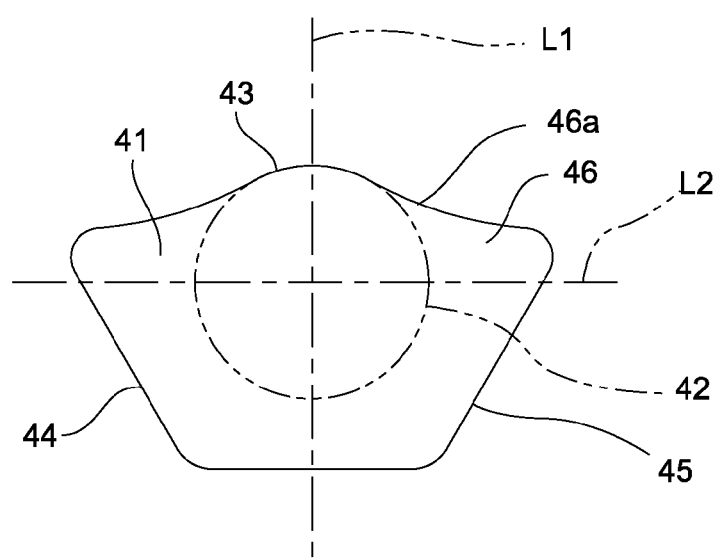
FIG. 25 is an enlarged view of a wedge shown in FIG. 2, etc.

The wedge 41 is symmetrical in shape with respect to a straight line L1 as shown in FIG. 25, and both the left and right sides of the wedge 41 lie flat on parallel planes. The wedge 41 is provided on the periphery thereof with an engaging portion 43, a pressing portion 44 and a slide-contact flat surface (surface contact portion) 45. The straight line L1 passes between the pressing portion 44 and the slide-contact flat surface 45. The peripheral surface of the engaging portion 43 is a circular arc surface which corresponds to a portion of an imaginary cylindrical surface 42 (the straight line L1 passing through the central axis thereof) positioned inside the wedge 41. The aforementioned curvature of the pressed portion 39a of the lock member 37 is smaller than the curvature of the engaging portion 43 of the wedge 41. The pressing portion 44 and the slide-contact flat surface 45 of the wedge 41, which are formed to be symmetrical with respect to the straight line L1, are positioned outside the imaginary cylindrical surface 42 and are each formed from a flat surface inclined to the straight line L1. The wedge 41 is further provided with a clearance-forming portion 46 which is positioned on the engaging portion 43 side (the lower side with respect to FIG. 25) of a straight line L2 which is orthogonal to the straight line L1 and passes through the axis of the imaginary cylindrical surface 42. The clearance-forming portion 46 is formed of a portion of the wedge 41 which is positioned on the engaging portion 43 side of a straight line L2 and positioned outside the imaginary cylindrical surface 42 (specifically on the right-hand side of the imaginary cylindrical surface 42 with respect to FIG. 25). A concave surface 46a (concave toward the inside of the wedge 41) which is continuous with the engaging portion 43 is formed on an peripheral surface of the clearance-forming portion 46.

Figure 22:
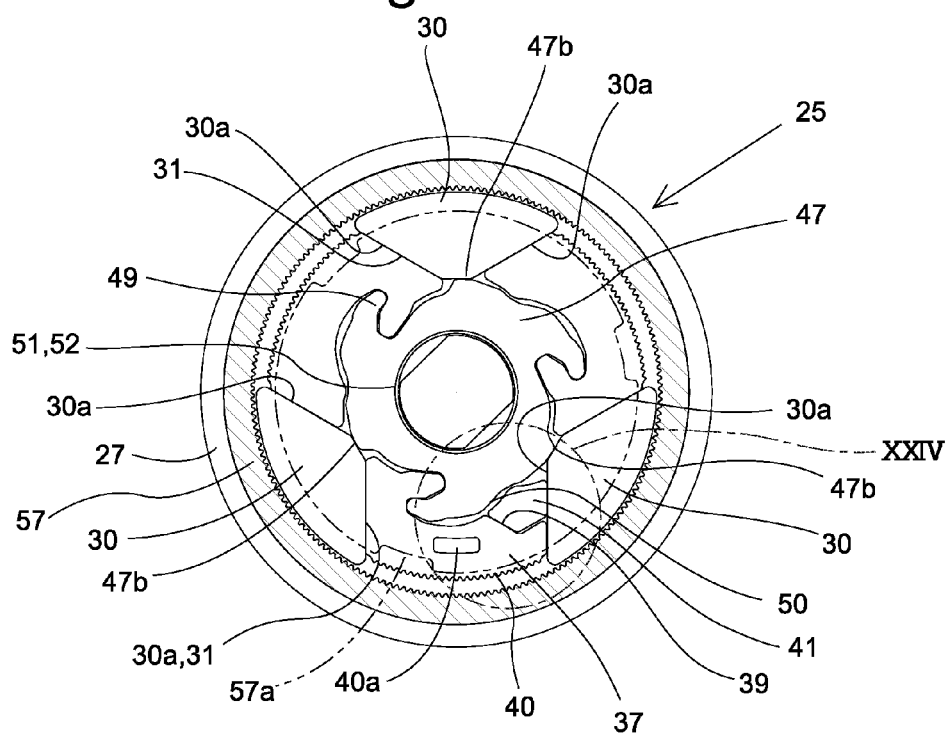
FIG. 22 is a view similar to that of FIG. 21, showing the seat reclining apparatus in an unlocked state.
Figure 23:
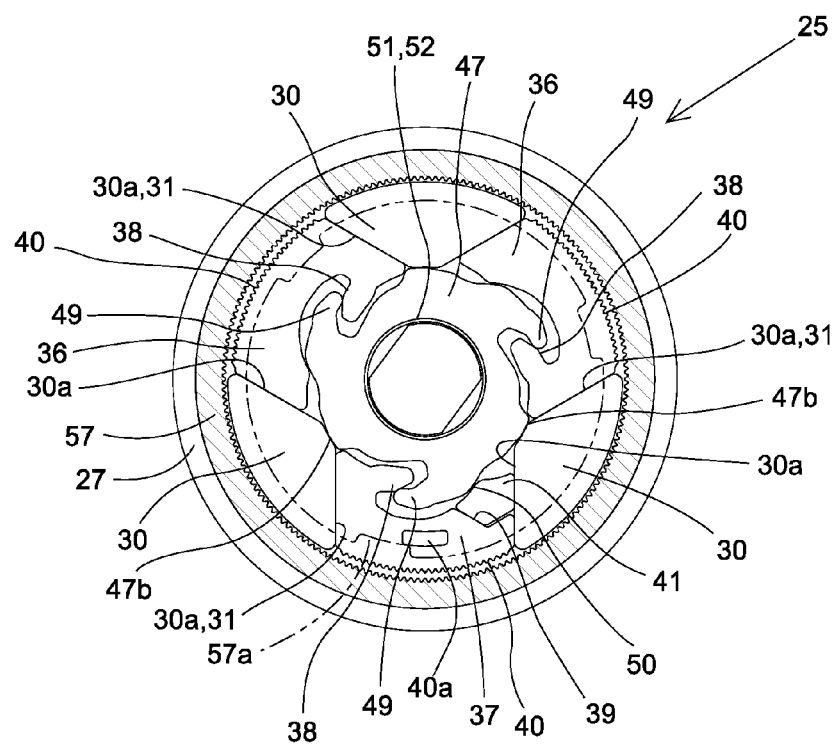
FIG. 23 is a view similar to that of FIG. 21, showing the seat reclining apparatus in an unlocked holding state.

The lock members 36, the lock member 37 and the wedge 41 are provided in the respective guide grooves 31 as shown in FIGS. 21 through 23. The right side surfaces of the lock members 36, the lock member 37 and the wedge 41 are all in surface contact with base (flat) surfaces (left side surfaces) of the guide grooves 31, respectively.

Figure 20:
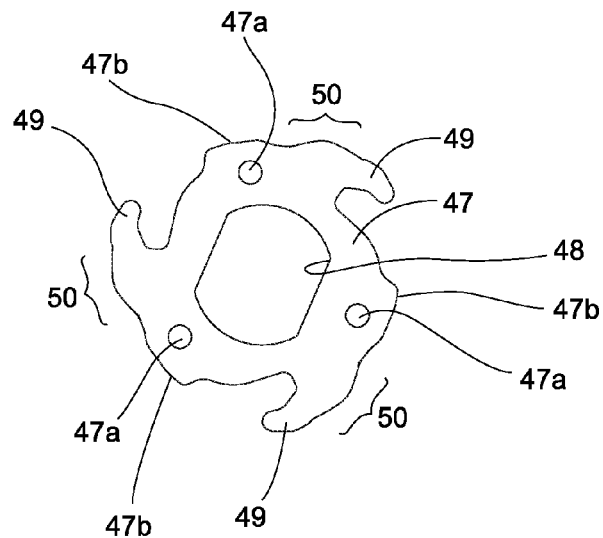
FIG. 20 is a left-side elevational view of a rotational cam (first cam) shown in FIG. 2, etc.

The rotational cam 47 is a press-molded product made of a metal plate and substantially identical in thickness to the three guide grooves 31. The rotational cam 47 is provided in the center thereof with a non-circular center hole 48, which is formed as a through-hole that is shaped as a circle with linearly cut-off opposite sides. The rotational cam 47 is provided, on the outer periphery thereof at intervals of 120 degrees, with three cam projections 49. As shown in the drawings, the rotational cam 47 is installed in the center of the aforementioned accommodation space of the base plate 27. As shown in FIG. 20, etc., the rotational cam 47 is provided, on the left side thereof at equi-angular intervals in the circumferential direction, with three rotation retaining projections 47a which project leftward. The three rotation retaining projections 47a are columnar in shape and mutually identical in specification. As shown in FIGS. 20 and 24, the rotational cam 47 is provided on the outer peripheries of the three cam projections 49 with three curved pressing surfaces 50, respectively, which are convex toward the outer peripheral side. The rotational cam 47 is further provided, on the outer periphery thereof at equi-angular intervals at different positions from the three curved pressing surfaces 50, with three lock-member pressing portions 47b.

The rotational center shaft 51 is made of metal and provided with a cam connecting shaft 52 and an annular flange 54.

The cam connecting shaft 52 is a tubular member having a non-circular cross section. Both ends of the cam connecting shaft 52 are open as clearly shown in FIG. 19. The cam connecting shaft 52 is geometrically similar in cross sectional shape to and slightly smaller in size than the non-circular center hole 48. The cam connecting shaft 52 is provided therein with a connecting hole 53 which is also geometrically similar in cross sectional shape to the non-circular center hole 48.

The annular flange 54 is integrally formed on the rotational center shaft 51 to project radially outwards from the left end of the cam connecting shaft 52. The annular flange 54 is in the shape of a flat plate orthogonal to the axis of the cam connecting shaft 52.

In addition, the annular flange 54 is provided at equi-angular intervals in the circumferential direction thereof with a total of six through-holes: a pair of small-diameter circular holes 55a, a pair of large-diameter through-holes 55b and a pair of elongated holes 55c. The pair of small-diameter circular holes 55a are circular holes identical in diameter to the three rotation retaining projections 47a. The pair of large-diameter through-holes 55b are circular holes slightly greater in diameter than the pair of small-diameter circular holes 55a (the rotation retaining projections 47a). The pair of elongated holes 55c are elongated holes which are shaped such that the minor diameter of each elongated hole 55c is identical to the diameter of each small-diameter circular hole 55a (each retaining projection 47a) and that the major diameter of each elongated hole 55c is greater than the diameter of each small-diameter circular hole 55a (each retaining projection 47a).

The rotational center shaft 51 is fixed to the rotational cam 47 with the two lock members 36, the lock member 37, the wedge 41 and the rotational cam 47 arranged in a clearance between the annular flange 54 and the base plate 27 and with the three rotation retaining projections 47a of the rotational cam 47 respectively engaged in one of the pair of small-diameter circular holes 55a, one of the pair of large-diameter through-holes 55b and one of the pair of elongated holes 55c. The cam connecting shaft 52 is loosely fitted into the non-circular center hole 48 of the rotational cam 47, and the end (right end) of the cam connecting shaft 52 projects rightward from the right side of the base plate 27 (see FIGS. 8 through 10). When the three rotation retaining projections 47a are engaged in one small-diameter circular hole 55a, one large-diameter through-hole 55b and one elongated hole 55c, respectively, play between the three rotation retaining projections 47a and the one small-diameter circular hole 55a, the one large-diameter through-hole 55b and the one elongated hole 55c substantially disappears, so that the rotational cam 47 and the rotational center shaft 51 become integral with each other (in other words, the rotational cam 47 and the rotational center shaft 51 are prevented from rotating relative to each other). Therefore, rotating the rotational center shaft 51 on the axis thereof relative to the base plate 27 (to the bearing hole 29) causes the rotational cam 47 to rotate with the rotational center shaft 51. In addition, since all the through-holes formed in the annular flange 54 are not formed as the small-diameter circular holes 55a but are formed in the above described manner, the three rotation retaining projections 47a can be easily fitted into three holes (one of the pair of small-diameter circular holes 55a, one of the pair of large-diameter through-holes 55b and one of the pair of elongated holes 55c) formed in the annular flange 54.

The ratchet plate 57 is a press-molded metal product which is shaped into a disk. The ratchet plate 57 is provided on the outer edge of the right side thereof with a small-diameter annular flange 58 having a circular shape, so that an accommodation space is formed radially inside the small-diameter annular flange 58 on the right side of the ratchet plate 57. The ratchet plate 57 is provided at the center thereof with a bearing hole 59 formed as a through-hole which is circular in cross sectional shape. The ratchet plate 57 is provided, on the left side thereof at intervals of 90 degrees in the circumferential direction about the bearing hole 59, with a total of four welding protrusions 60 which project leftward. The ratchet plate 57 is provided on the outer edge of the left side thereof with an annular stepped portion 62 (see FIGS. 8 through 10) that is positioned in the back of the small-diameter annular flange 58. In addition, the ratchet plate 57 is provided on an inner peripheral surface of the small-diameter annular flange 58 with an internal gear 63. The ratchet plate 57 is installed to cover the left side of the base plate 27 with the small-diameter annular flange 58 inserted into a clearance between the inner periphery of the large-diameter annular flange 28 and the outer peripheries of the three groove-forming projections 30. When the ratchet plate 57 is made to cover the base plate 27, the left side of the annular flange 54 faces the bottom (right side) of the aforementioned accommodation space of the ratchet plate 57 with a clearance formed therebetween, which prevents the rotational center shaft 51 from tilting relative to the axial direction thereof and prevents the two lock members 36, the lock member 37, the wedge 41 and the rotational cam 47 from rattling in the aforementioned accommodation spaces of the base plate 27 and the ratchet plate 57 in the axial direction of the rotational center shaft 51.

The retaining ring 64 is an annular ring member made of metal. The retaining ring 64 has a slightly greater outer diameter than that of the base plate 27. The retaining ring 64 is provided at the left end thereof with an annular adjacent portion 65 which projects toward the inner peripheral side (see FIGS. 8 through 10). The retaining ring 64 is fitted on the outer edges of the base plate 27 and the ratchet plate 57 with the annular adjacent portion 65 positioned on (opposed to) the left side of the annular stepped portion 62. The retaining ring 64 is provided on the right end thereof with an annular swaging portion 66. The retaining ring 64 is fixed to the base plate 27 by swaging the annular swaging portion 66 against an annular recess formed on the perimeter of the right side of the base plate 27. Once the base plate 27 and the retaining ring 64 are integrated (fixed to each other), the ratchet plate 57 is positioned between the base plate 27 and the retaining ring 64, so that the ratchet plate 57 is rotatable relative to the base plate 27 and the retaining ring 64 about the rotational center shaft 51 without coming off the base plate 27 or the retaining plate 64.

The lock spring 68 is a spiral spring that is formed by winding a metal belt into a spiral and is installed on the right side of the base plate 27. The end (inner end) of the lock spring 68 on the inner peripheral side is formed as a first locking portion 69 that is formed by bending the inner end of the lock spring 68 into a linear shape. The end (outer end) of the lock spring 68 on the outer peripheral side is formed as a second locking portion 70 which extends in a direction substantially parallel to a radial direction of the lock spring 68.

Figure 14:
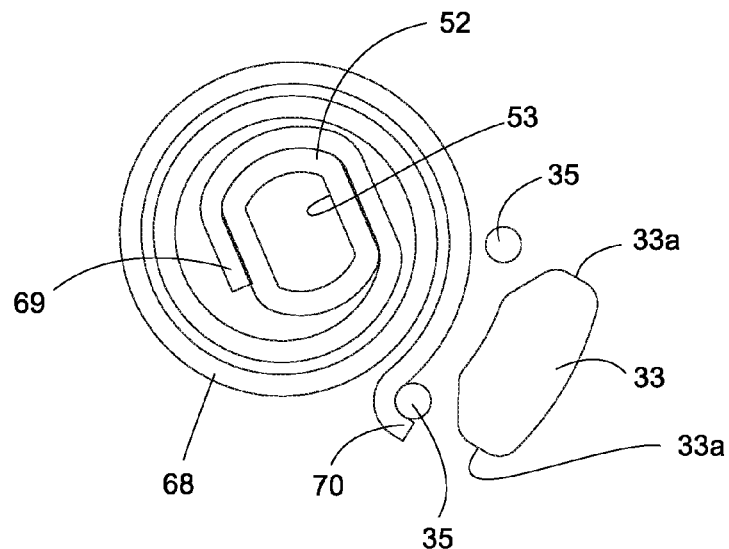
FIG. 14 is an enlarged side view of a portion of the base plate and a lock spring shown in FIG. 2, etc.
Figure 15:
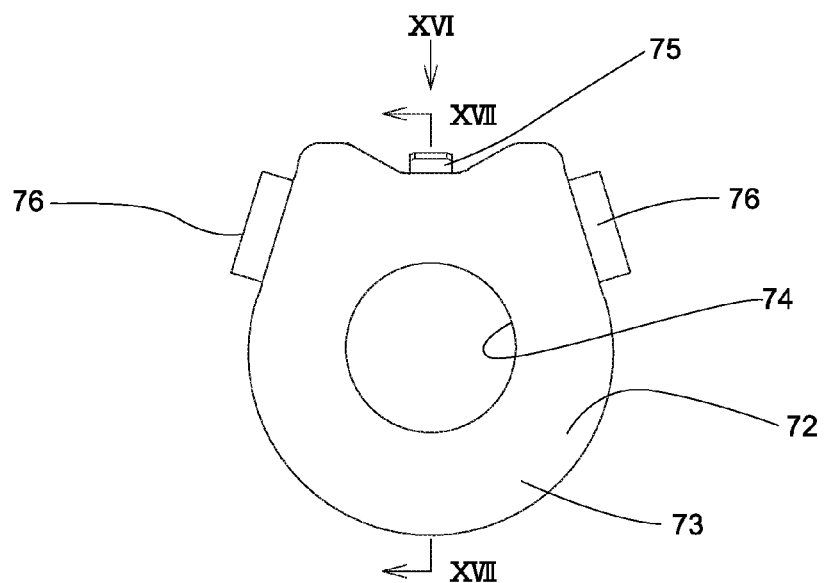
FIG. 15 is an enlarged side view of a spring cover shown in FIG. 2, etc.
Figure 16:
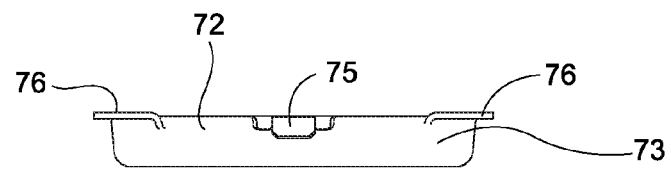
FIG. 16 shows the spring cover, viewed in the direction of the arrow XVI shown in FIG. 15.
Figure 17:
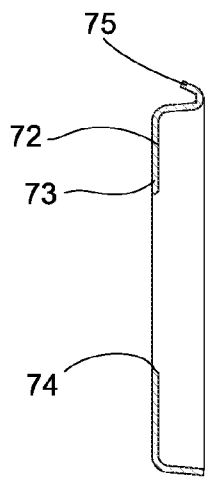
FIG. 17 is a cross sectional view taken along the line XVII-XVII shown in FIG. 15, viewed in the direction of the appended arrows.
Figure 18:
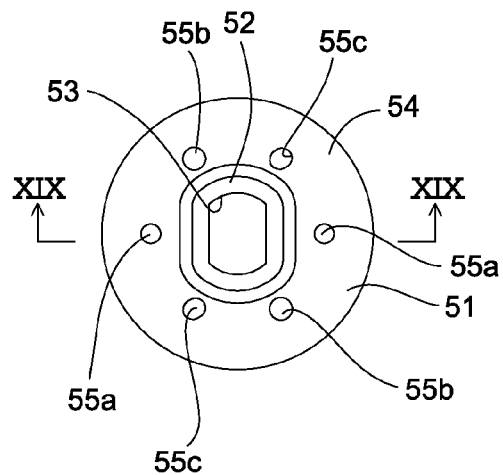
FIG. 18 is a right-side elevational view of a rotational center shaft shown in FIG. 2, etc.
Figure 19:
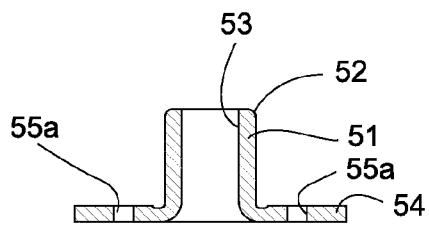
FIG. 19 is a cross sectional view taken along the line XIX-XIX shown in FIG. 18, viewed in the direction of the appended arrows.

The lock spring 68 is installed around the right end of the cam connecting shaft 52 that projects from the base plate 27. As shown in FIG. 14, the first locking portion 69 is locked onto a flat portion of the cam connecting shaft 52 which constitutes a portion of the outer periphery of the cam connecting shaft 52, while the second locking portion 70 is locked onto one of the locking projections 35.

When the lock spring 68 is installed onto the base plate 27 and the rotational center shaft 51 (the cam connecting shaft 52) in the above described manner, the lock spring 68 is slightly resiliently deformed to produce a biasing force that urges the rotational center shaft 51 to rotate in one direction. This biasing force urges the rotational center shaft 51 to rotate counterclockwise with respect to FIGS. 21 through 23, and accordingly, the rotational cam 47 is in the locked position shown in FIG. 21 when no external force other than the biasing force of the lock spring 68 is exerted on the rotational center shaft 51. When the rotational cam 47 is in the locked position, each lock-member pressing portion 47b presses the associated lock member 36 or 37 in a locking direction (toward the outer peripheral side). In addition, the curved pressing surface 50 of the specific cam projection 49 (specifically the upper cam projection 49 with respect to FIG. 21; the cam projection 49 shown in FIG. 24) of the rotational cam 47 presses the engaging portion 43 of the wedge 41 in a locking direction (toward the outer peripheral side), so that the wedge 41 slides toward the outer peripheral side of the base plate 27 while being guided by the flat guide surface 30a with which the slide-contact flat surface 45 of the wedge 41 is in surface contact, and the pressing portion 44 of the wedge 41 partly contacts and presses the pressed portion 39a with a large force. Therefore, the lock member 37 which is pressed both toward the flat guide surface 30a (which is positioned on the right-hand side of the lock member 37 with respect to FIG. 21) and in the locking direction moves to an engaged position in which the outer toothed portion 40 of the lock member 37 is engaged with internal gear 63 of the ratchet plate 57, so that the lock member 37 becomes immovable in the associated guide groove 31. On the other hand, since each of the two lock members 36 is allowed to move in a circumferential direction within the associated guide groove 31, each lock member 36 comes into engagement with the internal gear 63 of the ratchet plate 57 while moving (adjusting) in a circumferential direction within the associated guide groove 31. Accordingly, when the rotational cam 47 rotates to the locked position, each of the three lock members (the two lock members 36 and the lock member 37) securely performs a locking operation, so that the base plate 27 and the ratchet plate 57 are prevented from rotating relative to each other.

On the other hand, rotating the rotational center shaft 51 clockwise with respect to FIGS. 21 through 23 against the rotational biasing force of the lock spring 68 causes the rotational cam 47, which is in the locked position, to rotate to the unlocked position shown in FIG. 22. Thereupon, each of the three lock-member pressing portions 47b is disengaged from the associated lock member 36 or 37 toward the inner peripheral side, thus causing the curved pressing surface 50 of the specific cam projection 49 (specifically, the upper cam projection 49 with respect to FIG. 21) of the rotational cam 47 to be disengaged in the circumferential direction from the engaging portion 43 of the wedge 41. Additionally, each cam projection 49 engages with the associated cam groove 38 to move the associated lock member 36 or 37 radially inwards to the disengaged position shown in FIG. 22, which causes the outer toothed portions 40 of the three lock members 36 and 37 and the internal gear 63 of the ratchet plate 57 to be disengaged from each other to thereby allow the base plate 27 and the ratchet plate 57 to rotate relative to each other. Additionally, the wedge 41 becomes freely movable in the associated guide groove 31 within the area surrounded by the associated flat guide surface 30a, the lock member 37 (the pressed portion 39a) and the rotational cam 47 (the associated cam projection 49).

The spring cover 72 is made of metal and is mounted to the right side of the base plate 27. The spring cover 72 is formed from a metal plate by press molding. The base of the spring cover 72 includes a spring housing portion 73 which is non-circular in a side view and the entire left end surface thereof is open. A circular through-hole 74 is formed in the center of the spring housing portion 73. The spring cover 72 is provided on the outer edge of the left end of the spring housing portion 73 with an engaging projection 75, which is V-shaped in cross section and projects toward the outer peripheral side. In addition, the spring cover 72 is provided, on the outer edge of the left end of the spring housing portion 73 at different circumferential positions from the engaging projection 75, with two pressed lugs 76 which project toward the outer peripheral side. The two pressed lugs 76 are flat lugs which lie in a plane orthogonal to the leftward/rightward direction.

The spring cover 72 is installed onto the right side of the base plate 27 with the end of the cam connecting shaft 52 positioned in the circular through-hole 74 and with the spring housing portion 73 positioned between the three welding protrusions 33. Fitting the spring housing portion 73 into the space between the three welding protrusions 33 causes the retaining projections 34 of two of the three welding protrusions 33 to be engaged with two parts of the outer edge of the spring housing portion 73, respectively, and causes the retaining projection 34 of the remaining one welding protrusion 33 to be engaged with the end of the engaging projection 75. Accordingly, when the spring cover 72 is installed onto the right side of the base plate 27, the spring cover 72 becomes integral with the right side of the base plate 27.

Figure 6:
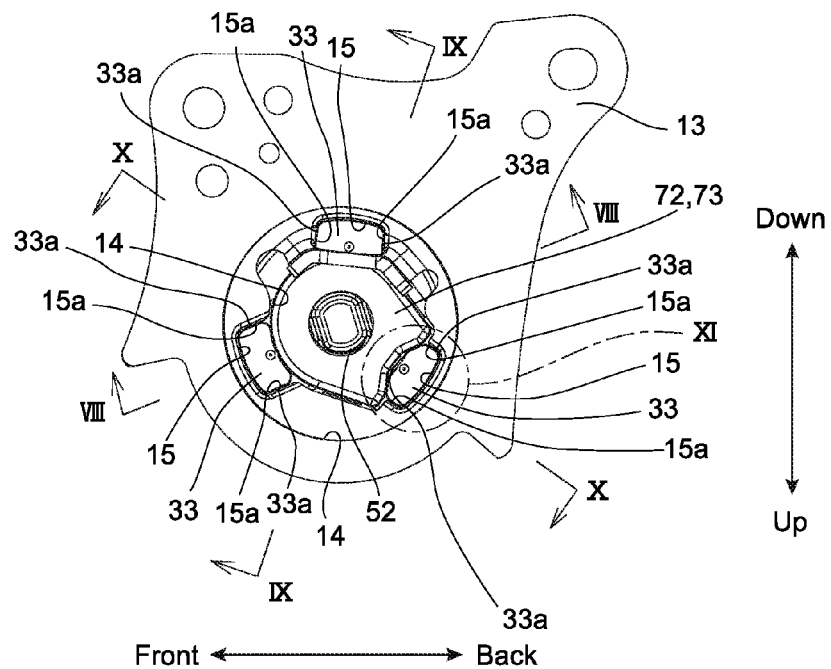
FIG. 6 is a right-side elevational view of the seat reclining apparatus in a locked state and a seat cushion side frame.
Figure 7:
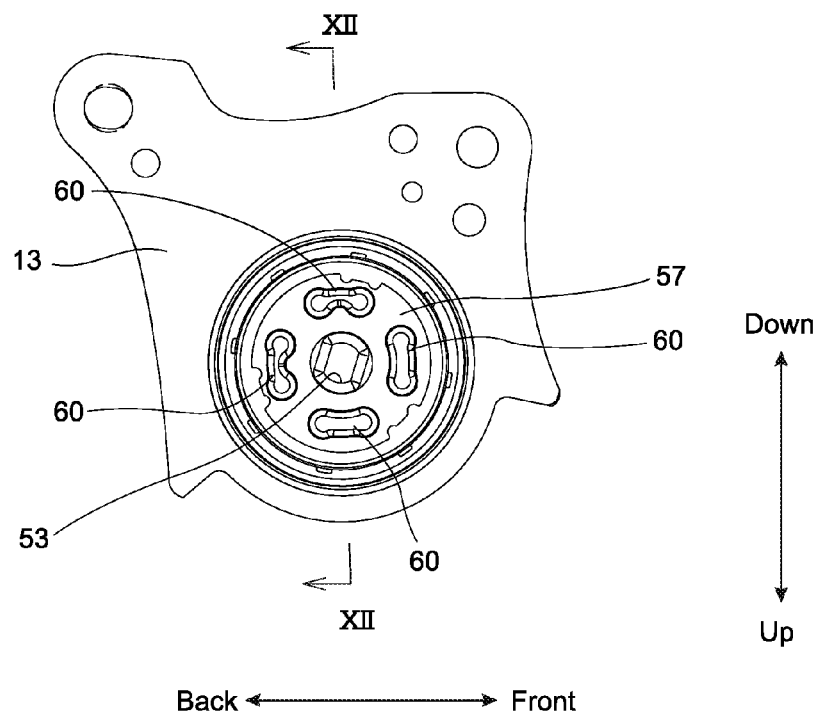
FIG. 7 is a left-side elevational view of the seat reclining apparatus in a locked state and a seat cushion side frame.
Figure 8:
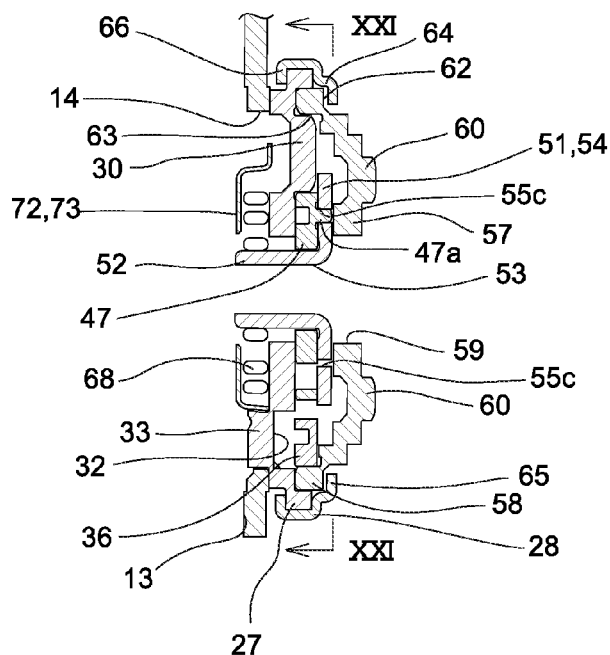
FIG. 8 is a cross sectional view taken along the line VIII-VIII shown in FIG. 6, viewed in the direction of the appended arrows.
Figure 9:
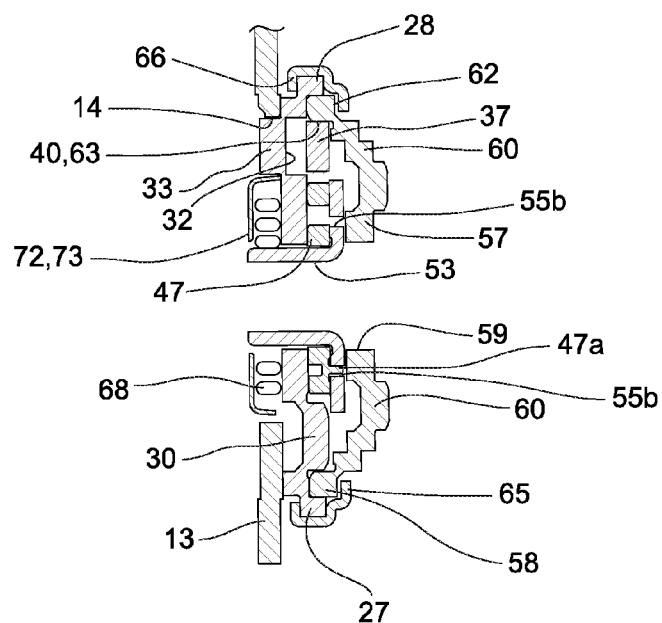
FIG. 9 is a cross sectional view taken along the line IX-IX shown in FIG. 6, viewed in the direction of the appended arrows.
Figure 10:
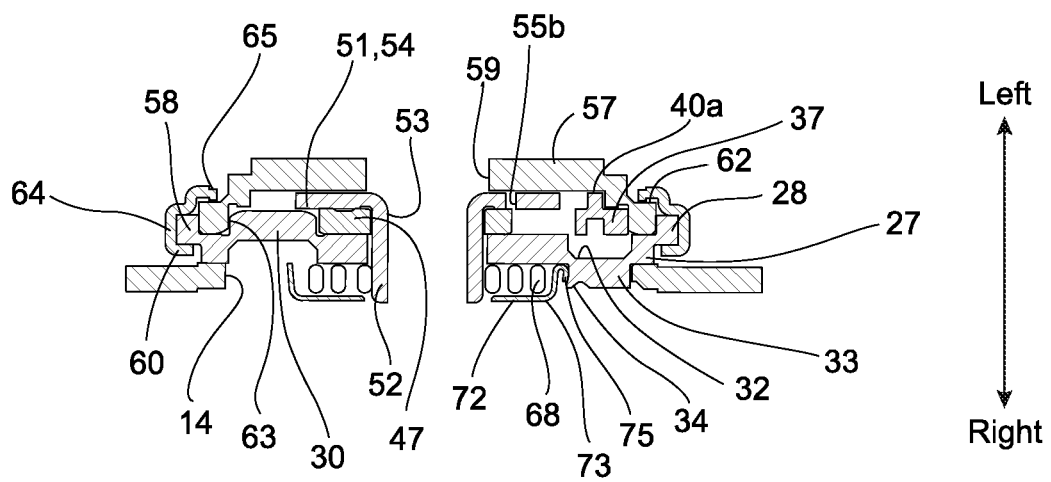
FIG. 10 is a cross sectional view taken along the line X-X shown in FIG. 6, viewed in the direction of the appended arrows.
Figure 11:
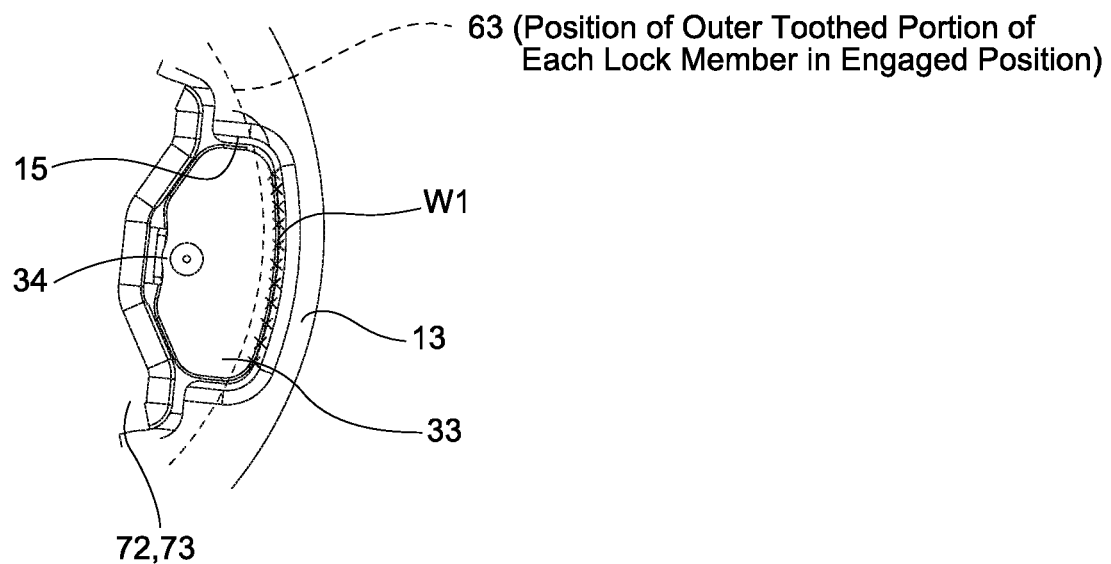
FIG. 11 is an enlarged view of a portion of the seat reclining apparatus which is designated by the Roman numeral XI shown in FIG. 6.
Figure 12:
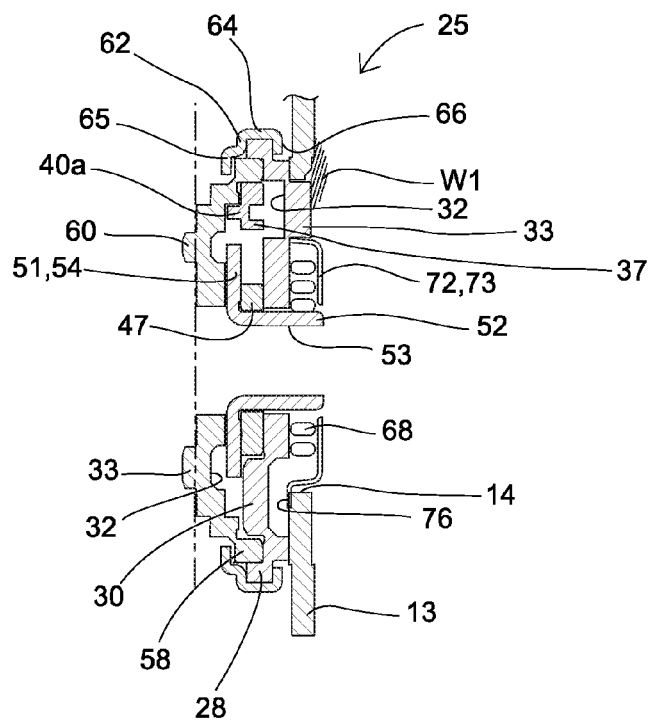
FIG. 12 is a cross sectional view taken along the line XII-XII shown in FIG. 7, viewed in the direction of the appended arrows.
Figure 13:
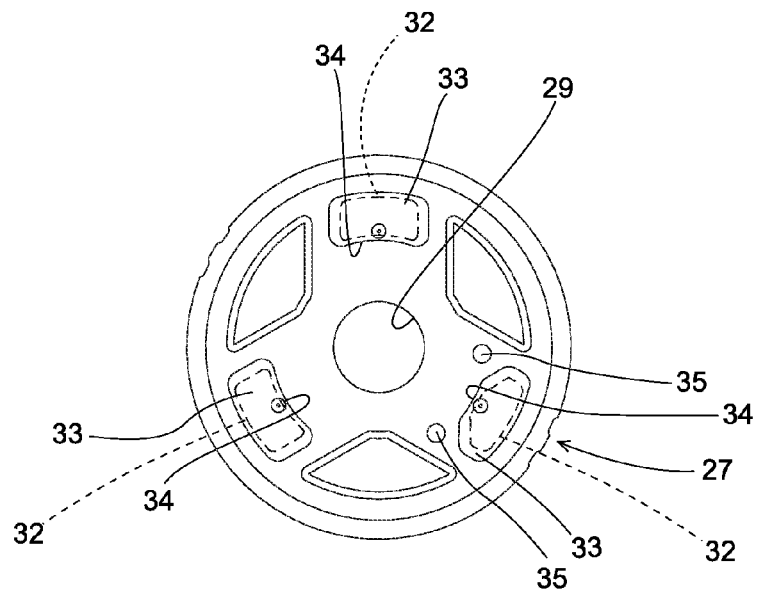
FIG. 13 is an external side (right-side) elevational view of a base plate shown in FIG. 2, etc.

As shown in FIG. 6, the base plate 27 of the seat reclining apparatus 25 is installed onto the rear frame 13 with the three welding protrusions 33 of the base plate 27 respectively engaged in the three engaging holes 15 of the rear frame 13 and with the side end surfaces 33a of each welding protrusion 33 respectively being in surface contact with the pair of flat portions 15a of the associated engaging hole 15. The rear frame 13 and the base plate 27 are fixed to each other by applying a weld W1 (indicated by many small cross marks shown in FIG. 11 and hatch lines shown in FIG. 12), from the right side of the rear frame 13, to each of three welding portions (only one of which is shown in FIG. 11) each of which extends over an outer peripheral edge (right edge with respect to FIG. 11) of one engaging hole 15 and an outer peripheral edge of the right end surface of the associated welding protrusion 33. As shown in FIG. 11, the outer peripheral edge of the right end surface of each welding protrusion 33 (the position at which the weld W1 is applied) is positioned closer to the outer peripheral side than the position of the internal gear 63 (i.e., the positions of the outer toothed portions 40 of the three lock members 36 and 37 when each of the three lock members 36 and 37 is in the engaged position) and the outer peripheral edges of the three protrusion-corresponding recesses 32 (see FIGS. 11 and 13). In addition, when the base plate 27 is fixed to the rear frame 13, an inner side surface of the rear frame 13 (the outer edge of the seat-cushion-side connecting hole 14) comes in contact with the outer side surfaces of the two pressed lugs 76, which easily and securely prevents the spring cover 72 from coming off the right side of the base plate 27.

On the other hand, the ratchet plate 57 of the seat reclining apparatus 25 is fixed to the seatback side frame 16 by respectively engaging the four welding protrusions 60 in the four fitting holes 18 and applying a weld (not shown), from the left side of the seatback side frame 16, to an outer peripheral edge of each engaging hole 18 and an outer peripheral edge of the left end surface of the associated welding protrusion 60.

After the rear frame 13 and the seatback side frame 16 are connected to the seat reclining apparatus 25, a connecting shaft (not shown) having a non-circular cross sectional shape which extends leftward from the base end of an operating lever (operating member) 21 (see FIG. 1) is press-fitted into the connecting hole 53 of the cam connecting shaft 52 through the circular through-hole 74 of the spring cover 72 to be fixed to the rotational center shaft 51 (to the connecting hole 53). Therefore, rotating the operating lever 21 about the aforementioned connecting shaft causes the rotational center shaft 51 to rotate with the operating lever 21 (the aforementioned connecting shaft).

Figure 2:
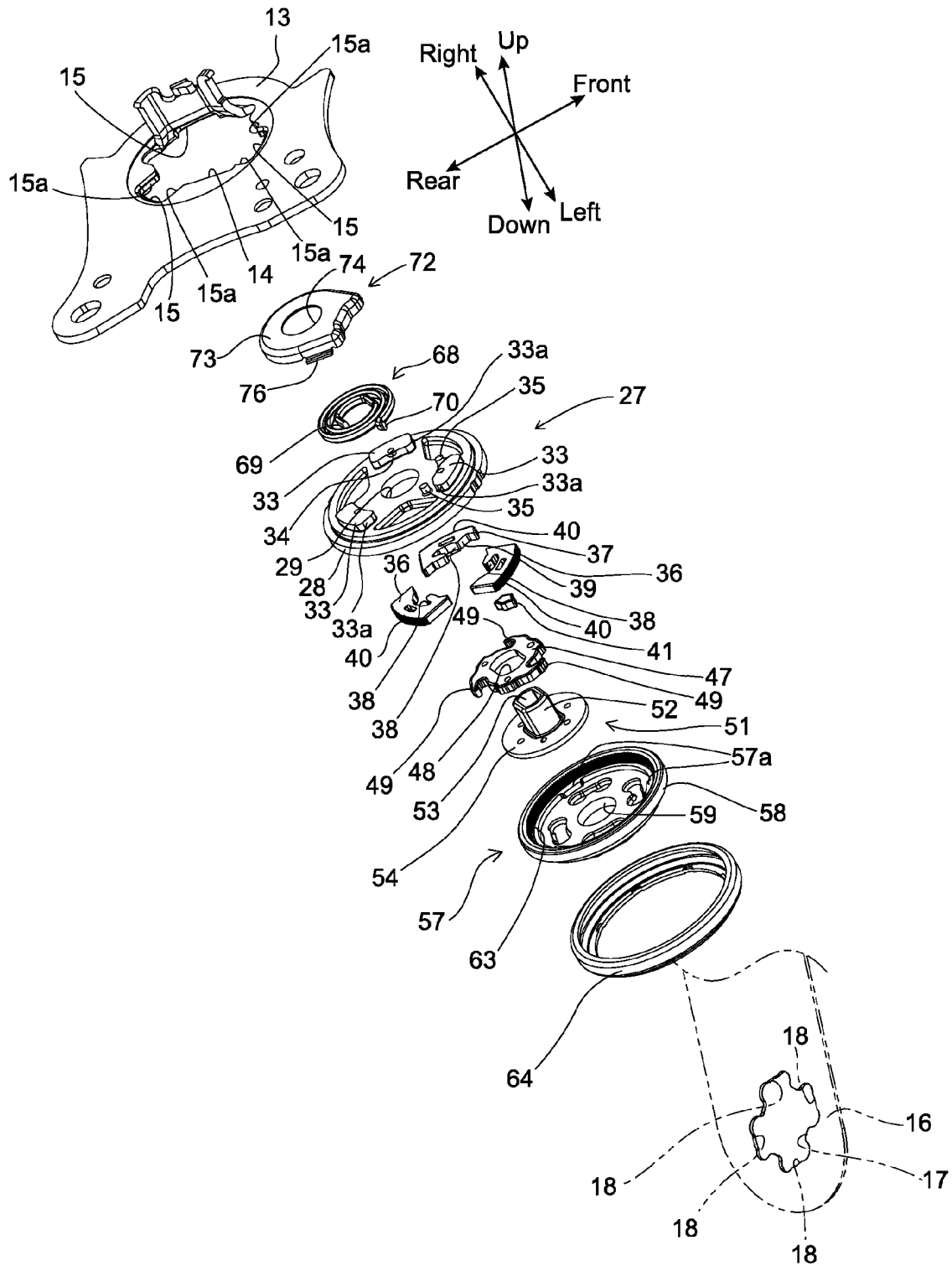
FIG. 2 is an exploded perspective view of the seat reclining apparatus.
Figure 3:
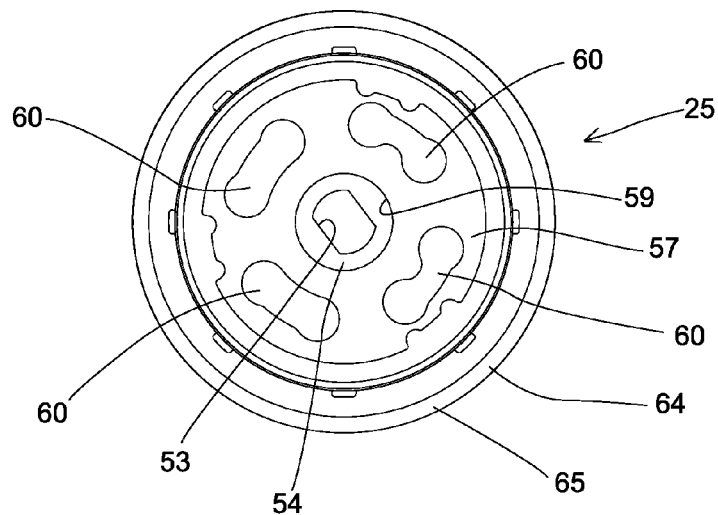
FIG. 3 is a left-side elevational view of the seat reclining apparatus.
Figure 4:
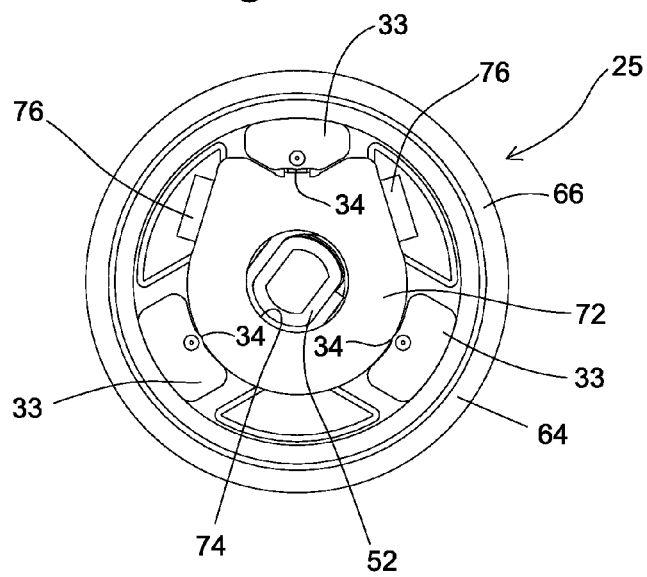
FIG. 4 is a right-side elevational view of the seat reclining apparatus.
Figure 5:
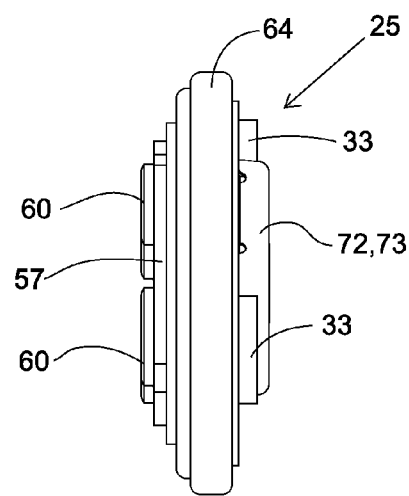
FIG. 5 is a rear elevational view of the seat reclining apparatus.

In the above described embodiment, the two lock members 36 and a combination of the lock member 37 and the wedge 41, which are shown in FIG. 2, are installed in the three guide grooves 31, which are formed in the base plate 27, to be slidingly movable therein, respectively, as described above. FIGS. 21 through 23 show the positional relationship between the combination of the lock member 37 and the wedge 41, and the two lock members 36 and the three guide grooves 31 (note that although these elements (31, 36, 37 and 41) are shown in FIG. 2, the positional relationship thereof is not coincident with that shown in FIGS. 21 through 23 for the purpose of illustration). The three guide grooves 31 are arranged at equi-angular intervals about a relative rotation axis (which is coincident with the axis of the rotational center shaft 51) for the base plate 27 and the ratchet plate 57 to extend radially. Additionally, one of the three guide grooves 31 extends vertically downwards from the relative rotation axis, and the lock member 37 and the wedge 41 are installed in this one guide groove 31. Accordingly, each of the remaining two guide grooves 31 extends obliquely upwards from the relative rotation axis, and the two lock members 36 are installed in these two upwardly-inclined guide grooves 31, respectively. A downward moving force (a force urging each lock member 36 toward the disengaged position to disengage the outer toothed portion 40 thereof from the internal gear 63 of the ratchet plate 57) is applied to each of the two lock members 36 by gravity.

On the other hand, the seat reclining apparatus 25 is provided between the lock member 37 and the ratchet plate 57 with an unlocked-state forcibly holding mechanism for forcibly holding the lock member 37 in the disengaged position when the ratchet plate 57 (the seatback side frame 16) is in an unlocked position (between the fully-forward tilted position and a position immediately in front of the first-stage locked position). Namely, the lock member 37 is provided on the left side thereof with an engaging projection (forced lock release projection) 40a which projects leftward and has a substantially rectangular cross sectional shape (neither of the two lock members 36 is provided with any engaging projection corresponding to the engaging projection 40a), and the ratchet plate 57 is provided, at equi-angular intervals in the circumferential direction thereof on an inner peripheral surface of the small-diameter annular flange 58 which is positioned one step to the left of the internal gear 63, with three unlocked-state holding projections 57a (shown also in FIG. 2) which project toward the inner peripheral side. The inner peripheral surface of each unlocked-state holding projection 57a is in the shape of a circular arc the curvature center of which corresponds to the axis of the ratchet plate 57.

Among the three unlocked-state holding projections 57a, the two unlocked-state holding projection 57a which are formed to correspond to the two lock members 36 have no functional use (are formed for reasons of molding the ratchet plate 57). Whereas, the unlocked-state holding projection (forced lock release surface) 57a which is formed to correspond to the engaging projection 40a of the lock member 37 forcibly holds the lock member 37 in the disengaged position when the ratchet plate 57 (the seatback side frame 16) is in the aforementioned unlocked position (between the fully-forward tilted position and a position immediately in front of the first-stage locked position).

Operations of the vehicle seat 10 will be discussed hereinafter.

When no external force is applied to the operating lever 21, the operating lever 21 is held in the non-operating position shown by a solid line in FIG. 1 by the rotational biasing force of the lock spring 68. Additionally, when no external force is applied to the operating lever 21, the rotational cam 47 is in the locked position and the lock member 37 is in the engaged position, so that the seat reclining apparatus 25 is in a locked state. This prevents the seat cushion 11 (the rear frame 13), which is integral with the base plate 27, and the seatback 12 (the pair of seatback side frames 16), which is integral with the ratchet plate 57, from rotating relative to each other. On the other hand, rotating the operating lever 21 clockwise with respect to FIG. 1 to the operating position shown by a two-dot chain line in FIG. 1 against the rotational biasing force of the lock spring 68 causes the rotational cam 47 to rotate to the unlocked position, thus causing each of the two lock members 36 and the lock member 37 to move to the disengaged position, so that the seat reclining apparatus 25 comes into an unlocked state. This allows the seat cushion 11 (the rear frame 13), which is integral with the base plate 27, and the seatback 12 (the pair of seatback side frames 16), which is integral with the ratchet plate 57, to rotate relative to each other.

When the seatback 12 (the pair of seatback side frames 16) is in a first-stage locked position shown by a solid line in FIG. 1, rotating the operating lever 21 to the operating position to move the seat reclining apparatus 25 to the unlocked state causes the seatback 12 to rotate (tilt) forward by the rotational biasing force of a rotational biasing spring (not shown) installed in the vehicle seat 10. Thereupon, the ratchet plate 57 rotates counterclockwise with respect to FIGS. 21 through 23 relative to the base plate 27. FIG. 23 shows a state of the interior of the seat reclining apparatus 25 when the seatback 12 has slightly rotated forward from the first-stage locked position. At this stage, of the three unlocked-state holding projections 57a of the ratchet plate 57, the inner peripheral surface of the unlocked-state holding projection 57a that corresponds to the lock member 37 enters a topping state (a state in which the seat reclining apparatus 25 is held in an unlocked state) in which this inner peripheral surface opposes (contacts) the engaging projection 40a (the outer peripheral surface thereof) of the lock member 37, which is positioned closer to the inner peripheral side than the inner peripheral surface of the unlocked-state holding projection 57a that corresponds to the lock member 37. On the other hand, since the two lock member 36 are respectively positioned in the two upwardly-inclined guide grooves 31, the two lock members 36 each receives a movement force toward the disengaged position; moreover, two of the three cam projections 49 of the rotational cam 47 are engaged in the cam grooves 38 of the two lock members 36 and move the two lock members 36 radially inwards to the disengaged position as shown in FIG. 22. The two cam projections 49 of the rotational cam 47 and the cam grooves 38 of the two lock members 36 constitute a secondary unlocked-state forcibly holding mechanism. Consequently, the engagement between the outer toothed portions 40 of the three lock members 36 and 37 and the internal gear 63 of the ratchet plate 57 are released to thereby allow the base plate 27 and the ratchet plate 57 to rotate relative to each other. The lock member 37 is held in the disengaged position by the engaging projection 40a thereof and the associated unlocked-state holding projection 57a of the ratchet plate 57.

On the other hand, when the seatback 12 is positioned at or behind the first-stage locked position shown by a solid line in FIG. 1, if one rotates the operating lever 21 in the non-operating position to the operating position while applying a rearward force to the seatback 12 (e.g., by the back of an occupant sitting in the vehicle seat 10) to change the seat reclining apparatus 25 to an unlocked state, the seatback 12 rotates rearward. Subsequently, if one returns the operating lever 21 to the non-operating position upon tilting the seatback 12 to a desired rearward-tilted position, the rotational cam 47 moves back to the locked position while each lock member 36 and 37 moves back to the engaged position by the rotational biasing force of the lock spring 68, so that the seatback 12 (the pair of seatback side frames 16) is held at the desired tilted position.

Figure 26:
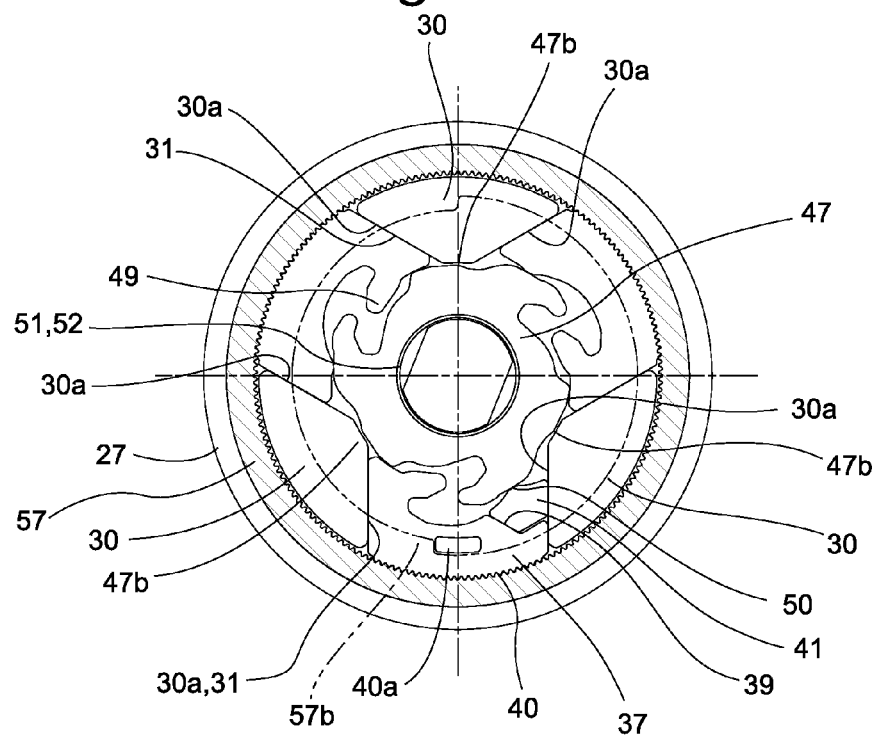
FIG. 26 is a view similar to that of FIG. 21, showing a second embodiment of the seat reclining apparatus according to the present invention, from which the seat cushion side frame, the retaining ring, the anti-rotation pins and the annular flange are removed for clarity.
Figure 27:
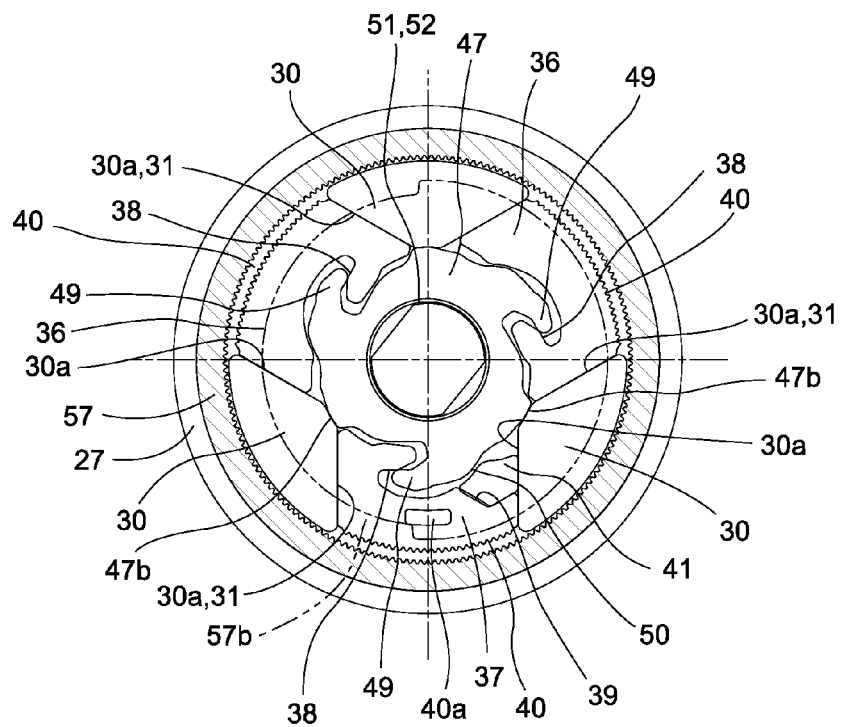
FIG. 27 is a view similar to that of FIG. 26, showing the second embodiment of the seat reclining apparatus in an unlocked state.

FIGS. 26 and 27 show another embodiment (second embodiment) of the seat reclining apparatus according to the present invention in which the ratchet plate 57 is provided with a single unlocked-state holding projection (forced lock release surface) 57b which forcibly holds the lock member 37 (the engaging projection 40a thereof) in the unlocked position (disengaged position). In this embodiment of the seat reclining apparatus, the ratchet plate 57 is provided with the unlocked-state holding projection 57b, instead of the three unlocked-state holding projections 57a that are three separate projections. The unlocked-state holding projection 57b continuously extends substantially halfway round the axis of the ratchet plate 57.

Although the number of lock members (36 and 37) is three, one lock member (the lock member 37) is provided with the engaging projection (forced lock release projection) 40a and the remaining two lock members (the two lock members 36) are provided with no engaging projection corresponding to the engaging projection (forced lock release projection) 40a in the above described embodiment of the seat reclining apparatus, the number of lock members can be increased or decreased. As a general rule, when the number of lock members is set to N (N is equal to or greater than two), the following condition is satisfied:

$$1 \leq X \leq N-1,$$

wherein X designates the number of lock members having no forced lock release projection.

Although the lock member 37, which includes the engaging projection 40a, is installed together with the wedge 41 in one guide groove 31 in the above illustrated embodiment of the seat reclining apparatus, the present invention can also be applied to the case where only the lock member 37, which includes the engaging projection 40a, is installed in one guide groove 31.

Alternatively, a combination of one lock member 36 and the wedge 41 can be installed in one guide groove 31 though each of the two lock members 36, which includes no projection corresponding to the engaging projection 40a, is solely installed in one guide groove 31 in the above illustrated embodiment of the seat reclining apparatus.

Although the base plate 27 is fixed to the rear frame 13 in the above described embodiment of the seat reclining apparatus to which the present invention has been applied, the present invention can also be applied to an embodiment of the seat reclining apparatus in which the base plate 27 is fixed to the seatback side frame 16.

Although the present invention has been described based on the above illustrated embodiment of the seat reclining apparatus, the present invention is not limited solely to this particular embodiment; various modifications to the above illustrated embodiment of the seat reclining apparatus are possible.

The left rear frame 13 (the left seat cushion frame) and the left seatback side frame 16 can be connected to each other via the seat reclining apparatus 25 instead of the right rear frame 13 (the right seat cushion frame) and the right seatback side frame 16 being connected to each other via the seat reclining apparatus 25. Additionally, it is possible to connect the left and right rear frames 13 and the left and right seatback side frames 16 to each other via left and right seat reclining apparatuses 25, respectively, and connect the rotational center shafts 51 of the left and right seat reclining apparatuses 25 to each other via a connecting pipe, or the like, so that the left and right seat reclining apparatuses 25 move in synchronization with each other.

Since the wedge 41 is symmetrical in shape with respect to the straight line L1 as shown in FIG. 25, the wedge 41 can also be applied to the left seat reclining apparatus 25 in the case where the seat reclining apparatus 25 is installed to each of the left and right sides of the vehicle seat 10 (or in the case where the seat reclining apparatus 25 is installed only onto the left side of the vehicle seat 10).

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A seat reclining apparatus comprising:
   a base plate which is fixed to one of a seat cushion side frame and a seatback side frame;
   a ratchet plate, which includes an internal gear, said ratchet plate being fixed to the other of said seat cushion side frame and said seatback side frame so as to face said base plate while being rotatable relative thereto about a relative rotation axis, wherein said internal gear is centered about said relative rotation axis;
   a plurality of lock members, each of which includes an outer toothed portion which is engageable with said internal gear and is supported by said base plate so as to be movable between an engaged position in which said outer toothed portion is engaged with said internal gear and a disengaged position in which said outer toothed portion is disengaged from said internal gear;
   an operating mechanism for moving each of said lock members between said engaged position and said disengaged position; and
   an unlocked-state forcibly holding mechanism for forcibly holding each of said lock members in said disengaged position,
   wherein said unlocked-state forcibly holding mechanism comprises:
   a forced lock release projection which is formed on at least one of said lock members; and
   a forced lock release surface which is formed on said ratchet plate and engages with said forced lock release projection to hold said lock members in said disengaged position when said seatback is in between a forwardly-tilted position and a first-stage locked position, and
   wherein a wedge, which is provided on said base plate, is arranged to come into contact with at least one of said lock members on which said forced lock release projection is formed,
   wherein said lock members on which said forced lock release projection is not formed are positioned above a horizontal line passing through said relative rotation axis so as to be subjected to a force that urges said lock members, on which said forced lock release projection is not formed, downward due to gravity when said seatback is in between said forwardly-tilted position and said first-stage locked position.

2. The seat reclining apparatus according to claim 1, further comprising a secondary unlocked-state forcibly holding mechanism for holding said lock members on which said forced lock release projection is not formed in said disengaged position, said secondary unlocked-state forcibly holding mechanism being positioned between said lock members on which said forced lock release projection is not formed and a cam mechanism for moving each of said lock members between said engaged position and said disengaged position.

3. The seat reclining apparatus according to claim 1, wherein three said lock members are provided, arranged at equi-angular intervals in a circumferential direction,
   wherein said forced lock release projection is formed on only one of said three lock members, and
   wherein said forced lock release projection is formed on neither of remaining two of said three lock members.

4. The seat reclining apparatus according to claim 1, wherein said forced lock release projection extends perpendicularly from said at least one of said lock members.

* * * * *